Nov. 17, 1925.

J. W. WHELLER 1,561,811

ELASTIC FLUID TURBINE

Filed Oct. 11, 1923

Patented Nov. 17, 1925.

1,561,811

UNITED STATES PATENT OFFICE.

JOHN WILLIAM WHELLER, OF ELIZABETH, NEW JERSEY, ASSIGNOR TO L. J. WING MANUFACTURING COMPANY, OF NEW YORK, N. Y., A CORPORATION OF NEW YORK.

ELASTIC-FLUID TURBINE.

Application filed October 11, 1923. Serial No. 667,802.

*To all whom it may concern:*

Be it known that I, JOHN WILLIAM WHELLER, a citizen of the United States, residing at 49 Sayre Street, Elizabeth, in the county of Union, State of New Jersey, have invented certain new and useful Improvements in Elastic-Fluid Turbines; and I do hereby declare the following to be a full, clear, and exact description of the invention, such as will enable others skilled in the art to which it appertains to make and use the same.

This invention relates to the construction of turbines, particularly elastic fluid turbines, and has for its object the provision of an improved turbine and method and apparatus for making the same.

Elastic fluid turbines are usually provided with buckets or blades which are acted upon by the working fluid to drive the turbines. Some of these buckets are mounted upon wheels forming the rotor of the turbine, and others are mounted in stationary position within the turbine casing. In the following discussion turbine wheels will be specifically referred to, although it is to be understood that the invention contemplates, as well, the mounting of the buckets upon other supporting structures.

The most common form of turbine wheel comprises a circular disc or body of suitable metal, for example steel or bronze, having one or more rows of buckets equally spaced about its periphery. The buckets are secured to the wheel body in various ways. In many instances the buckets are secured to the body of the wheel by some mechanical connection such as a groove in the surface of the disc adapted to receive appropriately formed feet on the buckets. In other types of turbine wheels, the buckets or blades are positioned in a mold, for casting the disc or body of the wheel, with their ends projecting into the matrix of the mold so that the molten metal may be poured about the ends of the blades to form the cast wheel body which is to support them. In some cases the buckets are held by the sand of the mold itself, and in other cases the buckets are held by a previously formed baked core. It is to the construction of this type of turbine wheel that this invention is particularly directed.

In making any turbine wheel it is of great importance that the buckets be positioned on the finished wheel in accurate alignment angularly, laterally, and radially, and that they be substantially equally spaced about the circumference of the wheel. The buckets are sometimes set square with the wheel, that is, with the plane through their tips parallel with the axis of rotation of the wheel, and sometimes, in order that the steam may act to greater advantage upon the buckets, they are so set that this plane makes a relatively small angle with the axis of rotation. This is what is meant by angular alignments. When the blades are in alignment laterally, they are disposed in the same plane transverse to the axis of rotation. Improper alignment of the buckets in each of these various respects is liable to affect the efficiency or mechanical balance of the turbine to a greater or less extent. For these same reasons it is also of importance that the buckets themselves be made with a high degree of accuracy so that all of the buckets are identical with each other as nearly as possible in size and shape.

It is further of great importance that the material of which the buckets are made be of a character to effectively resist the action of the steam. Hard drawn nickel steel is well adapted for this purpose, but as far as I am aware, has not been employed heretofore in turbines having cast-in buckets.

In the built-up type of turbines these conditions are quite well satisfied. In the present invention they are more nearly attained in a cast-in type of turbine wheel than heretofore.

In Patent No. 907,212 granted to L. J. Wing on December 22, 1908, there is shown a method and apparatus for making cast turbine wheels. In that patent a pattern is shown in combination with a follow-board for positioning the turbine buckets in the mold. The wheel pattern has a plurality of spaced recesses about its circumference and the follow-board has a series of cooperating equally spaced pins projecting from its surface. The buckets are positioned by inserting their shanks in the recesses in the pattern and by inserting their opposite ends between adjacent pins. In that disclosure, however, drop-forged buckets were contemplated in order to form a suitable shank to be received within the recesses. Drop-forging is a relatively inaccurate process and the dimensions of these buckets varied considerably so that in many cases the fit of the shanks in the recesses was loose.

Turbine wheels constructed in accordance with that patent have proven successful and operative in commercial practice. However, turbines constructed in accordance with the present invention are more efficient because the buckets are more accurately made and more accurately positioned on the finished wheel. They are more durable because the buckets are made from hard drawn nickel steel. A better mold is produced because the pattern employed in the present invention effectively excludes sand from entering between the tails of the buckets and the pattern into the matrix of the mold. The exclusion of the sand keeps the tails of the buckets from binding in the pattern, and the pattern is easier to remove from the mold. Buckets loosely mounted in the finished wheel, as occasionally were found when using the wing method, on account of the presence of sand in the mold, are never found in the practice of the present invention. Moreover, the present pattern holds the buckets firmly against movement in the radial direction, so that they are not pulled out when the sand is compacted between them during the making of the mold. This was a source of annoyance in the older method. The present pattern, moreover, so engages the buckets as to hold them accurately in any angular position desired. Hence, the buckets may be cast straight, or, by slightly modifying the pattern, at any desired angle.

In accordance with the present invention I, first of all, provide an accurately constructed bucket. This I prefer to accomplish by cutting from a strip of material previously formed to an appropriate bucket cross-section, a piece of appropriate length for a bucket, and cutting a pair of oppositely disposed notches one in each side edge of this piece near one end thereof, each notch having a positioning bottom wall with one side wall intersecting the bottom at less than a right angle. These notches form a tail portion comprising a pair of flaring fins joined to the body of the bucket by a shank having accurately formed faces. These faces and the other two walls of the notches provide means for engaging the buckets to hold them with great accuracy in the proper position while the mold is being made. Buckets may be made in this manner from hard drawn nickel steel stock.

I next provide a device or apparatus for assisting the making of molds for turbines, this apparatus in some cases taking the form of a pattern, as when making a wheel having a single row of buckets, and in other cases taking the form of a core box, as in the molding of a wheel having a plurality of rows of buckets.

This device is so constructed that it holds the buckets above described properly disposed around its periphery, and maintains them accurately in angular, lateral, and radial alignment, and equally spaced, while the mold or core is being made. Yet the buckets may be inserted in the apparatus before commencing to make the mold, or core, and the apparatus withdrawn from the buckets when the mold or core is completed, with extraordinary facility. By appropriately engaging the walls of the notches in the buckets, not only are the buckets accurately positioned, but also particles of sand are prevented from entering the matrix adjacent the tails and causing loose buckets in the finished wheel.

Briefly stated, the invention resides in an improved method of casting turbines which includes providing a bucket having a flaring tail portion with one or more accurately formed positioned surfaces, and positioning the bucket in the sand of the mold while the mold is being made by supporting means having positioning surfaces adapted to co-act with those on the tails of the buckets.

By the practice of my invention a mold is made having all of the walls of its matrix of the same material throughout, that is, either of sand alone, or of sand and core material, as in the best foundry practice, so that all parts of the wheel will cool as nearly as possible at the same rate and leave stresses of minimum value in the finished casting. The invention, however, also provides for so supporting the buckets in such a mold that they may be drawn inwardly to accommodate the shrinkage of the metal of the body of the wheel during cooling, and for so positioning the buckets that they will be accurately and securely mounted in the finished turbine wheel, or other supporting structure.

My invention further contemplates certain novel features which will be understood from the following description of two embodiments of the invention which are illustrated, by way of example, in the accompanying drawings. These drawings, however, are intended to assist the description of the invention and not to define the limits thereof.

In these drawings:

Figs. 26 to 33, inclusive, relate to the casting of a turbine wheel having two rows of buckets.

Figures 1, 2, 3, 4, 5, 6, 7, 8, 9, 10, 11, 12, 13, 14, 15, 16, 17, 18, 19, 20:
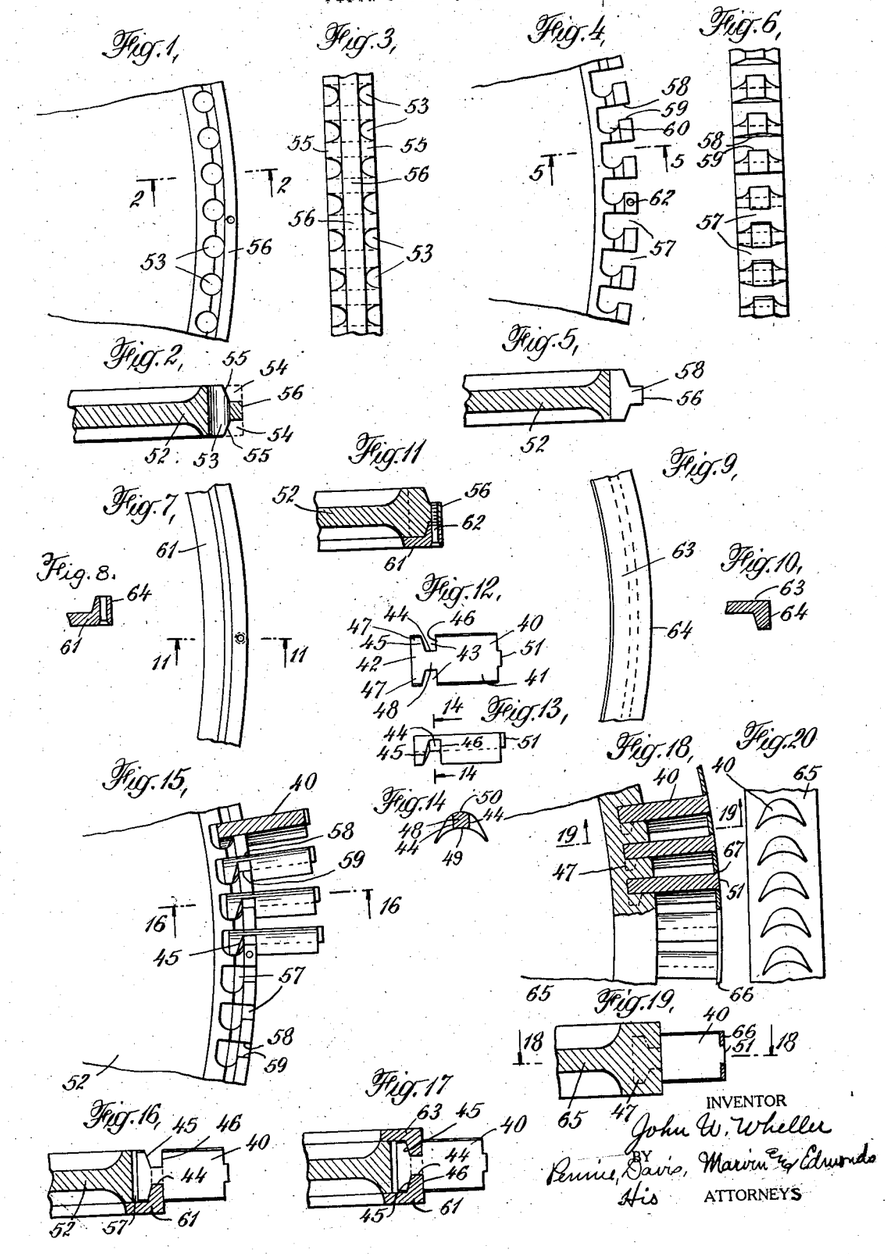
Figs. 1 to 6, inclusive, are various views illustrating the construction of the intermediate member of the pattern for casting a turbine wheel having a single row of buckets.
Fig. 7 is a fragmentary view of the lower stationary outer member or ring of this pattern.
Fig. 8 is a view in cross section taken on line 11—11 of Fig. 7.
Figs. 9 and 10 are views similar to Figs. 7 and 8, respectively, of the upper and removable outer member of the pattern.
Fig. 11 is a fragmentary cross section of the intermediate member of the pattern and the lower ring, this cross section being taken on line 11—11 of Fig. 7, to show the means of securing these two members together.
Figs. 12 and 13 are respectively a rear view and a side view of my improved turbine bucket.
Fig. 14 is a view in cross section taken on line 14—14 of Fig. 13 through the shank of the tail portion of the bucket.
Fig. 15 is a view of the improved pattern with a series of four buckets inserted, the upper removable ring not yet having been put in place.
Fig. 16 is a view in cross section taken on line 16—16 of Fig. 15.
Fig. 17 is a view in cross section also taken on line 16—16 of Fig. 15, but with the addition of the upper removable ring, and showing a bucket in position in the pattern as it is held during the making of the mold.
Figs. 18, 19, and 20 are fragmentary views of the finished cast turbine wheel, Fig. 18 being a central section on line 18—18 of Fig. 19, Fig. 19 being a section on line 19—19 of Fig. 18, and Fig. 20 being a development of the surface of the wheel with the outer binding strip removed to show the angular position of the buckets.
Figure 21:
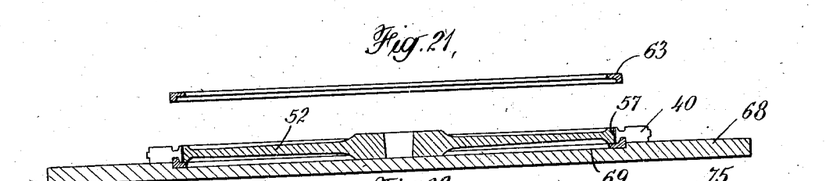
Figs. 21 to 25 inclusive, illustrate various steps in the making of the mold for casting a turbine wheel having a single row of buckets.

Referring first to Figs. 12, 13, and 14 of these drawings, there is here shown a turbine bucket 40 made in accordance with my invention. This bucket is of usual form in cross section, as may be seen in Fig. 14, and it comprises a main or working portion 41 and a tail portion 42. The tail portion is made by cutting a pair of notches 43 in the opposite side edges of the bucket, each of these notches preferably having a positioning bottom wall 44 with one side wall 45 intersecting the bottom wall at less than a right angle, and the third wall 46 of the notch, preferably the wall adjacent the main portion of the bucket, is substantially at right angles to the bottom of the wall 44 to form a shoulder. The cutting of these notches 43 leaves the tail portion extending from the bucket which consists of a pair of flaring fins 47 joined to the bottom of the bucket by means of shank 48.

This shank 48 is, in general, square in cross section, as may be seen from Fig. 14; but, in fact, is bounded by the two preferably flat positioning surfaces 44, the concave front surface 49, and the convex rear surface 50, these last two surfaces being portions of the previously formed boundaries of the bucket itself. The bucket is also provided with a lug 51 projecting from the end opposite the tail portion, the purpose of which will appear later.

The slots 43 may be cut in any way desired, the important point being to form the positioning surfaces 44 of the tail shank accurately. I have found that these notches may be cut, the lugs 51 formed, and the bucket itself cut off at proper length from a strip of material previously formed to appropriate bucket cross section, by means of an appropriately constructed punch and die. The configuration of the die is substantially that of Fig. 12, and it is curved on its upper surface to conform with the rear face of the section of bucket material which is the upper surface in Fig. 14. The punch is so constructed as to mate with this die and its working surface is curved to conform to the front surface of the section of bucket material which is the lower surface in Fig. 14. When a strip of bucket material is laid in this cradle-shaped die and the punch caused to move downward, a portion of the strip of bucket material is carried through the die, leaving the cut-out portions corresponding with the slots 43, and the corners on each side of lug 51, upon the upper surface thereof.

In this manner a bucket may be formed having positioning surfaces on the tail portion formed with a high degree of accuracy which will assist greatly in the casting of a turbine wheel with the buckets accurately positioned in its periphery. The degree of accuracy obtained by this method of making a turbine bucket is quite in contrast to the crudely formed bucket made by drop-forging. Furthermore, in this method it is entirely feasible to utilize as the stock from which the buckets are punched, a material which will be to a high degree resistant to the erosive action of the impinging jet of steam. One of the best known materials for this purpose is nickel steel, especially hard drawn nickel steel, and although this material is extremely hard and tough, the bucket stock can be pre-formed by the cold drawing process to the cross section desired, and then made into buckets in accordance with the method just described without consuming an undue amount of labor or power.

We will now consider the novel device for assisting the making of the mold for casting the turbine wheels, particularly the form of this device which comprises a pattern adapted to receive and retain the above mentioned turbine buckets and accurately position them in the mold. Another form which this device may assume, namely that of a core box, will be described later. Referring particularly to Figs. 1 to 5 of the accompanying drawings, which illustrate various steps in the making of the intermediate member of a pattern for casting a turbine wheel having a single row of buckets, the intermediate member 52 is first formed from some suitable material, such as aluminum, to correspond to the shape of the body of the wheel. A fragment of a member so formed is shown in Fig. 2, the original shape of the outside of the rim being indicated in dotted lines. A series of equally spaced holes 53 is next drilled from face to face of the rim, the number of these holes corresponding to the number of buckets to be mounted upon the wheel. Having done this, the portions 54 within the dotted lines of Fig. 2 are machined from the corners of the rim, leaving sloping faces 55 which intersect the previously drilled holes 53, and to leave an annular rib 56 of about the thickness of the width of the shank 48 of the buckets. Fig. 1 is a side view of the segment of the wheel shown in Fig. 2 after this machining operation has been completed, and Fig. 3 is an edgewise view corresponding to Fig. 1, and shows the curved intersections of the surfaces 55 with the holes 53.

Slots 57 are now milled through laterally of the rim of the wheel to intersect the holes 53 and form the roughly L-shaped openings indicated in Fig. 4. This completes the machining of the intermediate member of the pattern and the appearance of the slots which have been cut in the rim, as seen from the edge of the wheel, is shown in Fig. 6. From Fig. 5 which is a sectional view taken through the center of one of the slots 57, it may be seen that the shape of these slots corresponds to that of the tails 42 of the buckets, so that a bucket may be inserted in each of these slots, its shank fitting rather closely, say with about two one thousandths of an inch clearance, between the walls 58 and 59 thereof, and the flaring fins of the tails extending into the toe portion 60.

Upper and lower rings are now made which are adapted to co-act with the intermediate pattern member 52 to hold the buckets within the slots 57. The lower ring 61 (Figs. 7, 8, and 11) is permanently secured to the intermediate pattern member 52 in any suitable manner, such as by means of screws 62 passing at intervals through the ring, and tapped into the rib 56 as shown in Fig. 11. These two members, the intermediate pattern member and the lower ring, when thus assembled, will be called the main pattern. The upper ring 63 (Figs. 9 and 10) which is removable, is similar in all respects to lower ring 61, except that no provision is made for securing it to the intermediate pattern member. These two rings are adapted to cooperate with the intermediate pattern member to firmly secure the buckets within the slots 57 and to build up the rim of the wheel to the thickness desired. For the purpose of securing the buckets within the slots 57 these rings are each provided with a wedge-shaped annular portion or lip 64, which is adapted to enter the slots 44 of the buckets, and, by suitable engagement with the walls thereof and by co-acting with the sloping surfaces 55 of the intermediate pattern member, securely retain the buckets accurately positioned upon the rim of the wheel.

In Fig. 15 of the drawings a portion of the main pattern member, that is, the intermediate member and the lower ring, is shown with a plurality of buckets inserted therein ready to have the upper ring placed in position. A cross section in front of one of these buckets is shown in Fig. 16. In this view it may be seen that the slots 57 serve to equally space the turbine blades and that the surfaces 58 and 59 of these slots act to assist in holding the blades so that the axes of the blades project radially from the surface of the wheel. When, however, the upper removable ring 63 is placed in position it will serve to clamp the tails of the buckets against the lower ring 61 (Fig. 17), the sloping surfaces of these rings co-acting with the surfaces 45 of the bucket tails which intersect the positioning bottom walls 44 of the bucket slots at less than a right angle. The ends of the wedge-shaped portions or lips may also engage the positioning surfaces 44, although in some instances, it is desirable to leave a slight clearance at these points. The cylindrical surfaces of the wedge-shaped portions engage the shoulders 46 formed by the slots in the buckets to ensure that the buckets project radially and the co-action of all of these surfaces results in a clamping of the tail of the bucket to hold it accurately in position. Nevertheless, by simply removing the upper ring 61, each of the buckets may be easily lifted from its slot if desired. The overlapping of these surfaces assists in excluding sand from the matrix of the mold to be made.

The method by which this pattern is utilized to make a mold for casting a turbine wheel will presently be described, but before taking this up reference is made to Figs. 18, 19, and 20, which show fragmentary views of the finished product. In these figures the body of the wheel 65 has been cast about the tails of the buckets 40 which are firmly embedded in the metal of the rim, the flaring fins 47 of the tails extending circumferentially of the wheel and effectively preventing any displacement of the bucket. A shrouding band 66 is secured to the outer ends of the buckets by the lugs 51 which pass through holes in the band and are riveted over on the band as indicated at 67.

The method of preparing a mold for the casting of such a turbine wheel is illustrated in Figs. 21 to 25, inclusive. The main pattern is first laid upon a follow-board 68 provided with a circular recess 69 adapted to receive the lower ring of the pattern within it. The upper removable ring 63 has not been placed in position. The buckets 40 are now dropped into the slots 57 of the main pattern so that they project radially from its periphery, the two diagonally opposite buckets being shown in the figures. The depth of the recess 69 is such that the buckets will be supported level by their side edges which rest on the surface of the follow-board, so as to facilitate the placing of the upper ring 63 in position. The upper ring 63 is then placed upon the pattern and the buckets are properly held in the position desired, that is, equally spaced and in accurate alignment angularly, laterally, and radially.

A ring of sand 70 (Fig. 22) is then compacted with the fingers around and between the projecting ends of the buckets and sloped off at 71, as shown. This operation is greatly facilitated because of the fact that the buckets are firmly held against radial displacement by the engagement of the tail portions within the slots of the pattern and a great deal of time and annoyance is avoided. A distinct advantage exists here over the apparatus and method of the Wing patent above mentioned, where there was no provision against the buckets pulling out of the pattern which has caused a great deal of trouble and loss of time in making these molds.

Figure 22:
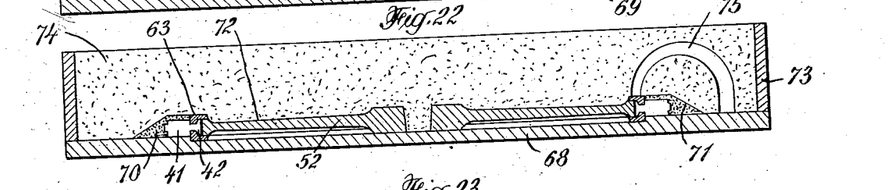

The entire surface 72 of the pattern including the compacted sand is now sprinkled with parting sand, and the cope 73 of the molding flask is placed upon the follow-board and filled with sand 74 which is tamped in place in the ordinary manner, a gate indicated diagrammatically at 75 being formed also in the usual way. The arrangement of the parts at this stage is indicated in Fig. 22.

Figure 23:
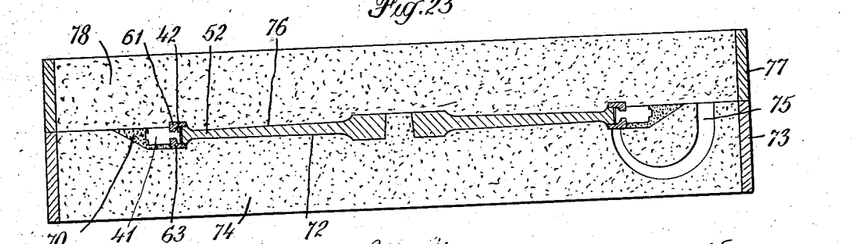
Figure 24:
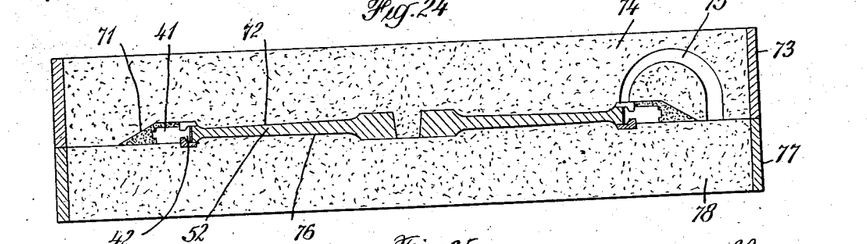

The cope and follow-board are next rolled over, that is, turned upside down, and the follow-board 68 is lifted off so that the parts are disposed as shown in the lower half of Fig. 23. The surface 76 of the pattern is now exposed and is first sprinkled with parting sand, then the drag 77 is placed on top of the cope, and sand 78 is filled in and tamped, as is customary. The mold is separable along two parting surfaces, namely surface 72 and surface 76.

Figure 25:
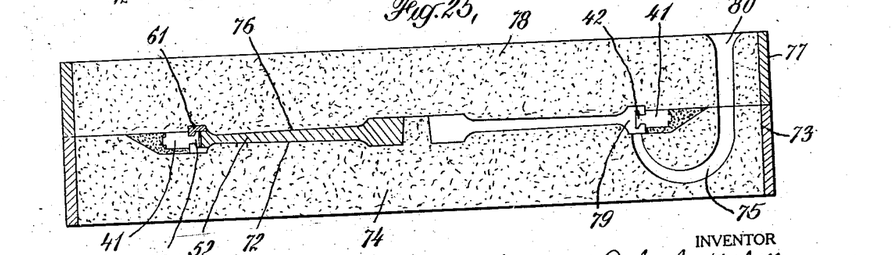
Figure 26:
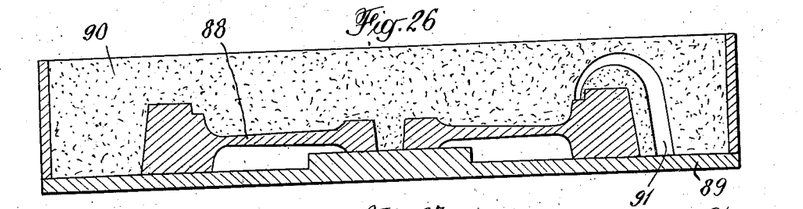
Figs. 26 and 27 illustrate the making of the sand mold.
Figure 27:
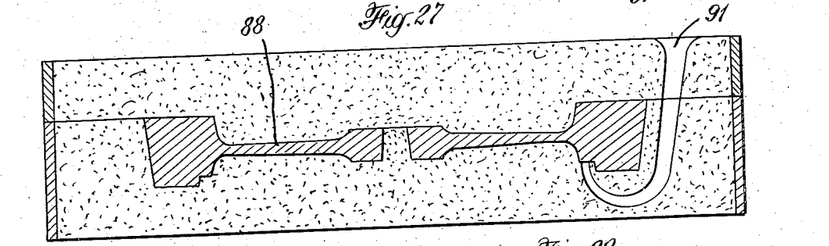

It now remains to remove the pattern from the mold. To do this, the whole mold is again rolled over, this time into the position shown in Fig. 24, and the cope is carefully lifted off, the mold parting along surface 72 and the upper sloping surface 71 of the compacted sand. The removable ring 63 was brought on top by the turning over of the mold, and may now be removed without difficulty. The ring 63 is shown removed in Fig. 24 and the cope has been replaced upon the drag preparatory to removing the main pattern. The main pattern cannot be removed with the flask in the position shown in Fig. 24, because it is locked in by the tails of the buckets. It is therefore necessary to again roll over the flask to the position shown in Fig. 25, and remove the drag, the mold this time separating along surface 76 of the pattern and the flat surface of the compacted sand. The main pattern, including the lower ring 61, may now be withdrawn vertically, the tails of the buckets sliding laterally in the slots 57. This leaves the main portions 41 of the buckets embedded in the sand of the mold with their tail portions 42 extending within the matrix 79 of the mold so that when the molten metal is poured in through the gate 75, the metal will flow into all parts of the matrix and surround the tails of the buckets and firmly embed them in the casting. In Fig. 25 the left-hand half is shown with the main portion still within the mold, and in the right-hand half of the figure, the entire pattern has been completely removed.

Referring again to Fig. 20 of the accompanying drawings, the buckets 40 are here shown as being set square in the wheel, that is, a line through their tips is parallel to the axis of rotation of the wheel. It is sometimes desirable to throw this line off slightly so that it will make an angle of, for example, from 3 to 5° with the axis of rotation. If it is desired to set the buckets at such an angle with the axis, it is only necessary to drill the holes 53 and to mill the slots 57 (Figs. 1, 4, and 6) at the desired angle, and this will cause the buckets to be properly held and positioned in the pattern, further details of which will be described in connection with the making of a casting of a turbine wheel having two rows of buckets, which will now be described.

Figure 28:
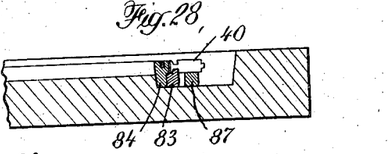
Figs. 28 and 29 are two sectional views of the core box for the second row of buckets.
Figure 29:
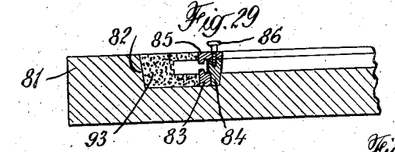
Figure 30:
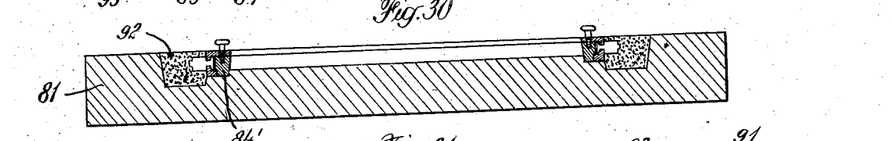
Fig. 30 is a similar view of the core box for the first row of buckets.

The casting of such a turbine wheel is illustrated in Figs. 26 to 31, inclusive. The improved device for assisting the making of molds here takes the form of a core box (Figs. 28, 29, and 30). The bucket-positioning members of the core box correspond with the three members of the pattern above described except that, as they do not perform the function of a pattern for the body of the wheel as well as serving to clamp the tails of the buckets, they may assume a different shape from that of the members of the pattern.

The core box 81 (Fig. 29) comprises a body of suitable material such as wood or metal, having an angular recess 82 therein substantially rectangular in shape in which the core may be molded in a well-known manner. The inner boundary of this annular recess is made up of the members for clamping the turbine buckets. These comprise a lower ring 83 which corresponds to lower ring 61 of the pattern, an intermediate ring 84 which corresponds to the intermediate member 52 of the pattern, and an upper removable ring 85 which corresponds to the upper removable ring 63 of the pattern. For convenience, a number of thumb screws 86 are provided for clamping the upper ring in position.

In making a core by the aid of this core box, the removable ring 85 is taken off of the box and the buckets inserted in the slots around the periphery of the member 84. It is convenient to place temporary supporting blocks, one of which is indicated at 87 (Fig. 28) to hold up the ends of the buckets until all of the buckets have been put in the slots and the upper ring set in place and screwed down by the thumb screws. After this has been done, the blocks 87 are removed and the core material is put into the recess 82 and worked around and between the outer ends of the buckets. After the upper surface is smoothed off, the ring 85 is removed, a roll-over plate is placed upon the top of the core box 81, and the whole turned over. The core box is then carefully lifted away from the core, and in doing this the slots in member 84 will allow the tails of the buckets to slide out of them, leaving the buckets firmly embedded in the core.

In a turbine wheel having two rows of buckets, it is necessary that the radial center of the working portions of the buckets in the two rows shall be substantially in alignment, and inasmuch as the buckets in the second row are longer than those in the first, it is necessary that the diameter of the core which supports the second row of buckets be somewhat less than the diameter of the core for the first row of buckets. Therefore, it is necessary to make a separate core box for the first row of buckets, and such a core box is illustrated in Fig. 30 and is constructed in the same manner as the boxes illustrated in Figs. 28 and 29, except that it may be desirable to modify the angular position at which the buckets are held, as will hereafter more fully appear. The core is molded in exactly the same way.

After having made the cores for the two rows of buckets, the mold for receiving them is made. In making this mold, a pattern is utilized which will properly form the matrix in accordance with the desired contour for the body of the wheel, and having a large rim portion which will form a matrix adapted to receive the two cores superimposed one upon the other.

Figure 31:
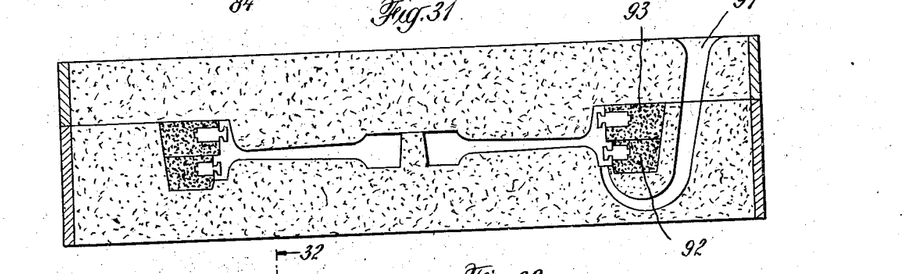
Fig. 31 is a view of the completed mold with the previously formed cores inserted therein.

In making such a mold, a suitable pattern 88 with a cope surrounding it is placed upon a roll-over plate 89 and sand 90 is thrown in and tamped down. The whole is then rolled over to the position shown in the lower half of Fig. 27, a drag is put on top of the cope, and sand is filled in and tamped down to form the opposite side of the matrix. A gate 91 is cut in the sand by which to pour the casting. The drag is then removed from the cope and the pattern 88 carefully taken out of the sand, leaving the matrix corresponding thereto. The core 92 holding the first row of buckets is then placed in this matrix and on top of this the second core 93 holding the second row of buckets. The arrangement of these cores 92 and 93 is shown in Fig. 31, where it will be seen that the cores hold the buckets with their tails projecting into the matrix of the mold so that when it is poured, the buckets will be embedded in the rim of the wheel.

Figure 32:
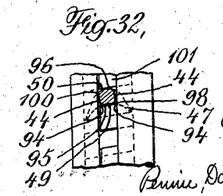
Fig. 32 is an enlarged view taken on line 32—32 of Fig. 33 to show the manner in which the shanks of the tail portions are engaged by the lateral slots in the intermediate member of the core box to hold the bucket in an angular position.
Figure 33:
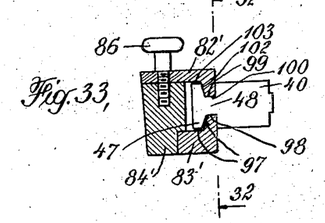
Fig. 33 is an enlarged view of the cross section showing the relation of the parts of the core box with a bucket clamped in position between them.

It may be desirable, particularly in a wheel having two rows of buckets, to place the buckets in the first row at a smaller angle with the axis of rotation, as mentioned above. I have found that this can be readily accomplished by cutting the slots in the intermediate member 84' of the core box 81' for the first bucket row, shown in Fig. 30, at an angle substantially corresponding to the angle at which it is desired that the bucket shall be mounted in the finished wheel. The action of the co-acting clamping surfaces when the buckets are held at an angle in this manner is illustrated in Figs. 32 and 33, where the clamping members of core box 81' are drawn to an enlarged scale and hold between them a turbine bucket exactly similar to the one illustrated in Figs. 12, 13, and 14.

It will be remembered that the shank 48 of the bucket tail is bounded by the two positioning surfaces 44 which are preferably flat and formed when the notches 43 are punched out, and by the concave surface 49 and the convex surface 50. Therefore, the two flat faces 44 intersect the concave surface 49 at an angle which is less than a right angle, and in sectional view, form a pair of cusps which are indicated at 94 in Fig. 32. Hence, when a bucket 40 is inserted in a slot in intermediate member 84' which has been cut therein at an angle, for example, of 3°, the cusps 94 co-act with the front surface 95 of this slot, and the convex surface 50 co-acts with the rear surface 96 of the slot. This results in a turning of the bucket through an angle of substantially 3°. A clearance is provided along the lines 97 of the lower member 83' (Fig. 33) so that the flaring tail fins 47 of the buckets will not bind against them because of the angular position of the bucket. The lower front corner 98 of the tail shank, therefore, rests upon the upper surface of the wedge-shaped portion or lip of ring 83' and when the removable ring 82' is put in position, the lower edge 99 of its wedge-shaped portion engages the corner 100 of the shank which projects above the side edge of the rib 101. The sloping surface 102 of removable ring 82' is also allowed to co-act with the surfaces of the tail portion of the bucket, but a clearance is provided so that the tip 103 of the upper flaring tail fin will not be engaged by the member 82'. In this way the angularly cut slots in the rib 101 of member 84' engage the shank of the bucket and accurately hold it at the proper angle. The tilted shank thus presents two diagonally opposed corners 98 and 100 so that they may be gripped by the edges of the clamping rings 82' and 83' and the wedge-shaped portion or lip of the removable ring 82' only is relied upon to align the bucket radially.

Even though the slots in the intermediate member 84' are cut at a relatively small angle, the buckets may be readily dropped into place in these slots and the clamping ring 82' inserted and removed without difficulty. Also, when the core material has been placed in the core box and the molded core is ready to be removed therefrom, the angularity of the slots in the intermediate member, which serve to position the buckets, will not hinder the lifting off of the core box from the core because of the curvature of the surfaces 49 and 50 of the tail shanks.

By employing the method and apparatus of this invention for the casting of turbine wheels, a wheel is produced which in many respects is superior to the cast-in turbine wheels heretofore made. The use of a cold drawn stock which is very readily formed to accurate cross section, and the formation of the tail portion by the simple operation of cutting a pair of notches in a piece of this stock provides a bucket which is made with great accuracy from exceptionally hard and serviceable material. The provision of the pattern, or core box as the case may be, provided with the intermediate member with equally spaced slots for spacing the buckets, and the wedge-shaped co-acting clamping members for engaging the accurately cut surfaces of the tail portion, ensures that the bucket will be held accurately in position, whether in the sand of the mold, or in the sand of the core. Because of the close co-action between the surfaces of the tail portions of the buckets and the pattern, and because of the overlapping of these portions, substantially all of the loose sand which tends to work into the mold will be excluded so that all danger of loose buckets is obviated. Furthermore, by this invention a cast-in type of turbine wheel having buckets of hard drawn nickel steel may be readily produced.

I claim:

1. A device for assisting the making of molds for elastic fluid turbines having cast-in buckets comprising, a main portion having radial slots in its periphery each adapted to receive the tail portion of a bucket and being open at one side for the insertion and removal of the buckets, and a removable ring cooperating with the side of the main portion adjacent the open sides of the slots and having a projecting lip co-acting with a notch in each bucket to maintain the buckets accurately in position and against displacement from said slots while the mold is being made.

2. A device for assisting the making of molds for elastic fluid turbines having cast-in buckets comprising, an intermediate member and two outer members cooperating therewith, the intermediate member having a series of spaced slots in its periphery each adapted to receive the tail of a bucket, and each outer member having a wedge-shaped portion adapted to co-act with wedge-shaped notches in the tails of buckets inserted in said slots to hold the buckets accurately in position while the mold is being made.

3. A device for assisting the making of molds for elastic fluid turbines having cast-in buckets comprising, an intermediate member having radial slots in its periphery each adapted to receive a bucket having a notched tail portion and being open at the side for the insertion and removal of the bucket, and a pair of rings, one of which is removable, cooperating with the sides of the intermediate member adjacent the open sides of the slots, each ring having a projecting lip, one face of which cooperates with the shoulder formed by the outer face of the notch in each tail portion, and the opposite face of which converges with respect to the first face to co-act with a sloping wall of the notch, whereby to accurately maintain the buckets in position and against displacement while the mold is being made.

4. A device for assisting the making of molds for elastic fluid turbines having cast-in buckets comprising, an intermediate member having radial slots in its periphery the opposite faces of which are parallel and inclined at a relatively small angle to the side surfaces of the member, each slot being adapted to receive a bucket having a tail portion provided with a wedge-shaped notch and having a shank adapted to be engaged by said inclined surfaces, said slots also being open at the side for the insertion and removal of the bucket, and a pair of rings, one of which is removable, cooperating with the sides of the intermediate member adjacent the open sides of the slots, each ring having a projecting lip one face of which cooperates with the shoulder formed by the outer face of the notch in each bucket and the opposite face of which converges with respect to the first face to co-act with a sloping wall of the notch, whereby to accurately maintain the buckets in position and against displacement while the mold is being made.

5. A device for assisting the making of molds for elastic fluid turbines having cast-in buckets comprising, a main portion having radial slots in its periphery, the opposite faces of which are parallel and inclined at a relatively small angle to the side surfaces of the device, each slot being adapted to receive a bucket having a tail portion provided with a wedge-shaped notch and having a shank adapted to be engaged by said inclined surface, said slots also being open at the side for the insertion and removal of the buckets, and a removable ring co-operating with said main portion adjacent the open sides of the slots and having a projecting lip, one face of which co-operates with the shoulder formed by the outer face of the notch in each bucket and the opposite face of which converges with respect to the first face to co-act with a sloping wall of the notch, whereby to accurately maintain the buckets in position and against displacement while the mold is being made.

6. A device for assisting the making of molds for elastic fluid turbines having cast-in buckets comprising, a main portion having radial slots in its periphery, each adapted to receive a tail portion of the bucket, and being open at one side for the insertion and removal of the buckets, and a removable ring co-operating with the side of the main portion adjacent the open sides of the slots and having a wedge-shaped annular lip for co-acting with a wedge-shaped notch in the bucket to maintain the buckets accurately in position and against displacement while the mold is being made.

7. A device for assisting the making of molds for elastic fluid turbines having cast-in buckets comprising, a main portion having radial slots in its periphery each adapted to receive a tail portion of the bucket and being open at one side for the insertion and removal of the buckets, said main portion also having a wedge-shaped annular lip for coacting with a wedge-shaped notch in the bucket, and a removable ring cooperating with the side of the main portion adjacent the open side of the slots and having a second wedge-shaped annular lip for coacting with a second wedge-shaped notch in the bucket, said annular lips cooperating with the main portion of the device to maintain the buckets accurately in position and against displacement while the mold is being made.

In testimony whereof I affix my signature.

JOHN WILLIAM WHELLER.